US008668010B2

(12) United States Patent
Joseph et al.

(10) Patent No.: US 8,668,010 B2
(45) Date of Patent: Mar. 11, 2014

(54) WELLBORE SERVICING COMPOSITIONS COMPRISING A FLUID LOSS AGENT AND METHODS OF MAKING AND USING SAME

(75) Inventors: Trissa Joseph, Pune (IN); Pankaj Phani Chakraborty, Nagaon (IN); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 357 days.

(21) Appl. No.: 12/961,234

(22) Filed: Dec. 6, 2010

(65) Prior Publication Data
US 2012/0138299 A1   Jun. 7, 2012

(51) Int. Cl.
*C09K 8/487* (2006.01)
*C04B 28/06* (2006.01)

(52) U.S. Cl.
USPC .................. 166/282; 166/281; 106/692

(58) Field of Classification Search
None
See application file for complete search history.

(56) References Cited

U.S. PATENT DOCUMENTS

| | | | |
|---|---|---|---|
| 3,236,305 A | 2/1966 | Parks | |
| 3,734,188 A * | 5/1973 | Root et al. ................. | 166/292 |
| 4,015,991 A * | 4/1977 | Persinski et al. ........... | 524/5 |
| 4,244,826 A | 1/1981 | Swanson | |
| 4,466,893 A | 8/1984 | Dill | |
| 4,674,574 A * | 6/1987 | Savoly et al. .............. | 166/293 |
| 4,683,952 A * | 8/1987 | Peiffer et al. .............. | 166/293 |
| 5,340,397 A * | 8/1994 | Brothers .................... | 106/727 |
| 5,346,012 A | 9/1994 | Heathman et al. | |
| 5,588,488 A | 12/1996 | Vijn et al. | |
| 5,913,364 A | 6/1999 | Sweatman | |
| 5,975,206 A | 11/1999 | Woo et al. | |
| 6,110,271 A | 8/2000 | Skaggs et al. | |
| 6,167,967 B1 | 1/2001 | Sweatman | |
| 6,258,757 B1 | 7/2001 | Sweatman et al. | |
| 6,497,283 B1 | 12/2002 | Eoff et al. | |
| 6,607,035 B1 | 8/2003 | Reddy et al. | |
| 6,616,753 B2 | 9/2003 | Reddy et al. | |
| 6,743,288 B2 | 6/2004 | Eoff et al. | |
| 6,767,867 B2 * | 7/2004 | Chatterji et al. .......... | 507/216 |
| 6,770,604 B2 | 8/2004 | Reddy et al. | |
| 6,796,378 B2 | 9/2004 | Reddy et al. | |
| 6,822,061 B2 | 11/2004 | Eoff et al. | |
| 6,846,357 B2 * | 1/2005 | Reddy et al. ............... | 106/692 |
| 6,846,420 B2 | 1/2005 | Reddy et al. | |
| 6,855,672 B2 | 2/2005 | Poelker et al. | |
| 6,904,971 B2 | 6/2005 | Brothers et al. | |
| 6,978,835 B1 | 12/2005 | Reddy et al. | |
| 6,981,552 B2 | 1/2006 | Reddy et al. | |
| 7,007,752 B2 | 3/2006 | Reddy et al. | |
| 7,026,272 B2 | 4/2006 | Reddy et al. | |
| 7,073,585 B2 * | 7/2006 | Morgan et al. ............. | 166/294 |
| 7,091,159 B2 | 8/2006 | Eoff et al. | |
| 7,143,828 B2 | 12/2006 | Reddy et al. | |
| 7,216,707 B2 | 5/2007 | Eoff et al. | |
| 7,229,952 B2 | 6/2007 | Reddy et al. | |
| 7,287,587 B2 | 10/2007 | Reddy et al. | |
| 7,290,613 B2 | 11/2007 | Santra et al. | |
| 7,294,194 B2 | 11/2007 | Reddy et al. | |
| 7,325,611 B2 | 2/2008 | Santra et al. | |
| 7,325,613 B2 | 2/2008 | Reddy et al. | |
| 7,331,390 B2 | 2/2008 | Eoff et al. | |
| 7,337,842 B2 | 3/2008 | Roddy et al. | |
| 7,384,893 B2 * | 6/2008 | Morgan et al. ............. | 507/225 |
| 7,384,894 B2 * | 6/2008 | Morgan et al. ............. | 507/225 |
| 7,438,758 B2 | 10/2008 | Santra et al. | |
| 7,449,062 B2 | 11/2008 | Santra et al. | |
| 7,462,234 B2 | 12/2008 | Reddy et al. | |
| 7,547,665 B2 | 6/2009 | Welton et al. | |
| 7,576,040 B2 * | 8/2009 | Lewis et al. ............... | 507/206 |
| 7,607,483 B2 | 10/2009 | Reddy et al. | |
| 7,621,334 B2 | 11/2009 | Welton et al. | |
| 7,686,084 B2 | 3/2010 | Reddy et al. | |
| 7,687,440 B2 | 3/2010 | Reddy et al. | |
| 7,694,739 B2 * | 4/2010 | Brothers et al. ............ | 166/294 |
| 7,740,066 B2 | 6/2010 | Xu et al. | |
| 7,842,652 B2 * | 11/2010 | Lewis et al. ............... | 507/206 |
| 7,857,053 B2 * | 12/2010 | Michaux et al. ........... | 166/292 |
| 7,862,655 B2 * | 1/2011 | Brothers et al. ............ | 106/724 |
| 2003/0008779 A1 * | 1/2003 | Chen et al. ................ | 507/200 |
| 2003/0083204 A1 * | 5/2003 | Chatterji et al. ........... | 507/200 |
| 2004/0262000 A1 * | 12/2004 | Morgan et al. ............. | 166/293 |
| 2005/0034864 A1 * | 2/2005 | Caveny et al. ............. | 166/293 |
| 2005/0124503 A1 * | 6/2005 | Morgan et al. ............. | 507/226 |
| 2006/0091572 A1 | 5/2006 | Santra et al. | |

(Continued)

OTHER PUBLICATIONS

Norman, Lewis R., et al., "Temperature-stable acid-gelling polymers: laboratory evaluation and field results," Journal of Petroleum Technology, Nov. 1984, pp. 2011-2018, Society of Petroleum Engineers of AIME.
"Recommended practice for testing well cements," ANSI/API Recommended Practice 10B-2 (Formerly 10B), Jul. 2005, First Edition, pp. 90-95 and title page, American Petroleum Institute.
Foreign communication from a related counterpart application—International Search Report and Written Opinion, PCT/GB2011/001690, Mar. 22, 2012, 13 pages.
Foreign communication from a related counterpart application—International Preliminary Report on Patentability, PCT/GB2011/001690, Jun. 12, 2013, 9 pages.

*Primary Examiner* — Angela M DiTrani
*Assistant Examiner* — Anuradha Ahuja
(74) *Attorney, Agent, or Firm* — Craig Roddy; Conley Rose, P.C.

(57) ABSTRACT

A method of servicing a wellbore comprising preparing a composition comprising a calcium aluminate cement, water, and a fluid loss additive wherein the fluid loss additive comprises an acid gelling polymer, placing the composition in the wellbore, and allowing the composition to set. A method of servicing a wellbore comprising placing into a wellbore having a bottom hole static temperature of greater than about 50° F. and/or a pH of from about 3 to about 9 a cement slurry comprising a calcium aluminate cement having an aluminum oxide content of greater than about 60 wt. % based on the total weight of the calcium aluminate cement and an acid-gelling polymer wherein the cement slurry has a fluid loss at 10 cc/10 min. to about 600 cc/30 min.

23 Claims, No Drawings

(56) References Cited

U.S. PATENT DOCUMENTS

| | | | |
|---|---|---|---|
| 2007/0012447 A1* | 1/2007 | Fang et al. | 166/291 |
| 2008/0182764 A1 | 7/2008 | Xu et al. | |
| 2008/0236451 A1* | 10/2008 | Reddy et al. | 106/696 |
| 2008/0236826 A1* | 10/2008 | Reddy et al. | 166/292 |
| 2008/0300149 A1 | 12/2008 | Reddy et al. | |
| 2008/0300150 A1 | 12/2008 | Reddy et al. | |
| 2008/0308011 A1* | 12/2008 | Brothers et al. | 106/641 |
| 2008/0308275 A1* | 12/2008 | Brothers et al. | 166/295 |
| 2009/0181866 A1 | 7/2009 | Reddy et al. | |
| 2010/0139920 A1 | 6/2010 | Willimann et al. | |
| 2011/0067867 A1 | 3/2011 | Reddy et al. | |

* cited by examiner

WELLBORE SERVICING COMPOSITIONS COMPRISING A FLUID LOSS AGENT AND METHODS OF MAKING AND USING SAME

BACKGROUND

1. Technical Field

The present disclosure generally relates to servicing a wellbore. More particularly, this disclosure relates to servicing a wellbore with calcium aluminate cement compositions comprising a fluid loss additive and methods of making and using same.

2. Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Wellbore servicing fluids are often modified to allow them to function for their intended purpose under extreme conditions (e.g., high temperatures/pressures, acidic environment). At high static subterranean temperatures, and in the presence of brines containing carbon dioxide, conventional hydraulic cements rapidly deteriorate due to alkali carbonation. Thus, the use of conventional hydraulic cement compositions in these types of environments may result in the loss of wellbore integrity. An alternative to conventional hydraulic cements when cementing in challenging environments such as steam injection wells or steam production wells is a calcium aluminate cement (CAC). The higher temperature resistance of a CAC when compared to Portland cement/silica mixtures is an advantage for long term integrity of the cement sheath. The use of a CAC offers many advantages as they provide in addition to high and low temperature resistance, resistance to sulfates, corrosion, and sour gas. Additional examples of wellbore servicing operations that typically employ CACs include the servicing of geothermal wells or carbon dioxide injection wells. CACs combined with a soluble phosphate salt, for example sodium metaphosphate, and a pozzolanic material such as Class F fly ash form quick setting CACs that upon setting bind well to the subterranean formation and to itself and display desirable mechanical properties such as high strength, carbonation resistance, low permeability, and improved corrosion resistance. A variety of CACs are commercially available with varying alumina contents.

High alumina cement compositions are best suited for cementing wells exposed to either elevated temperatures and/or acidic environments (for example, $CO_2$ environment). A challenge to the use of such cements has been that conventional fluid loss agents may exhibit reduced effectiveness as the alumina content of the CAC increases. An ongoing need exists for fluid loss control additives in compositions comprising CACs.

SUMMARY

Disclosed herein is a method of servicing a wellbore comprising preparing a composition comprising a calcium aluminate cement, water, and a fluid loss additive wherein the fluid loss additive comprises an acid gelling polymer, placing the composition in the wellbore, and allowing the composition to set.

Also disclosed herein is a method of servicing a wellbore comprising placing into a wellbore having a bottom hole static temperature of greater than about 50° F. and/or a pH of from about 3 to about 9 a cement slurry comprising a calcium aluminate cement having an aluminum oxide content of greater than about 60 wt. % based on the total weight of the calcium aluminate cement and an acid-gelling polymer wherein the cement slurry has a fluid loss at 10 cc/10 min. to about 600 cc/30 min.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are wellbore servicing compositions comprising a calcium aluminate cement (CAC) and a fluid loss additive and methods of making and using same. Such wellbore servicing agents and fluid loss additives are described in more detail later herein.

In an embodiment, the wellbore servicing composition comprises a CAC, which further comprises calcium, aluminum, and oxygen, and sets and hardens by reaction with water. In an embodiment, the CAC comprises aluminum oxide ($Al_2O_3$) and calcium oxide (CaO). In an embodiment, aluminum oxide is present in the CAC in an amount of from about 30 wt. % to about 80 wt. %, alternatively from about 40 wt. % to about 70 wt. %, alternatively from about 50 wt. % to about 60 wt. %, based upon the total weight of the CAC or alternatively greater than 60 wt. % based upon the total weight of the CAC. Calcium oxide may be present in the CAC in an amount of from about 20 wt. % to about 60 wt. %, alternatively from about 30 wt. % to about 50 wt. %, alternatively from about 35 wt. % to about 40 wt. %, based upon the total weight of the CAC. Additionally, the aluminum oxide to calcium oxide ($Al_2O_3$/CaO) weight ratio in the CAC may vary from about 1:1 to about 4:1, alternatively from about 2:1 to about 1.5:1.

The CAC, when mixed in an aqueous fluid, may have a pH in the range of from about 3 to about 10, alternatively from about 4 to about 9, alternatively from about 6 to about 8. In an embodiment, the CAC may be present in the wellbore servicing composition in an amount of from about 20 weight percent (wt. %) to about 99 wt. %, alternatively from about 20 wt. % to about 70 wt. %, alternatively from about 25 wt. % to about 60 wt. %, alternatively from about 30 wt. % to about 50 wt. %, based upon total weight of the solid and liquid components.

Non limiting examples of CACs suitable for use in this disclosure include SECAR 80, SECAR 60, SECAR 71, SECAR 41, and SECAR 51, which are commercially available from KERNEOS INC., Cheasapeake, Va.; CA-14, CA-270, and CA-25 cements commercially available from Almatis, Inc., Leetsdale, Pa.; and THERMALOCK cement, which is commercially available from Halliburton Energy Services, Inc.

CACs of the type described herein may be utilized in wellbore servicing operations wherein the wellbore is expected to experience elevated bottom hole static temperatures (BHST) and/or an increased exposure to an acidic environment. Herein elevated BHSTs refer to temperatures of greater than about 170° F., alternatively greater than about 250° F., alternatively greater than about 300° F. while an acidic environment refers to a pH of from about 3 to about 9, alternatively from about 4 to about 8, alternatively from about 5 to about 7.

In an embodiment the wellbore servicing composition comprises a fluid loss additive. Herein fluid loss additives refer to materials used to control the loss of fluid to the formation through filtration. In an embodiment, the fluid loss additive comprises an acid gelling polymer (AGP). Herein an acid gelling polymer refers to a polymeric material which when contacted with an acidic fluid increases the viscosity of the fluid. It is contemplated that any polymeric material able to viscosify an acidic fluid of the type described herein may be suitably employed in this disclosure as an AGP. The acidic fluid may comprise hydrochloric acid, hydrofluoric acid, acetic acid, formic acid, citric acid, ethylenediaminetetraacetic acid ("EDTA"), glycolic acid, gluconic acid, sulfamic acid, or combinations thereof. For example, the acidic fluid may be an acetic acid solution at a concentration of 5% by weight.

In an embodiment an AGP suitable for use in the present disclosure may increase the viscosity of an acidic fluid by equal to or greater than about 100 cP, alternatively by equal to or greater than about 1000 cP, alternatively by equal to or greater than about 5000 cP. In such embodiments, the acidic fluid contains 5% acid by weight and the AGP is present in an amount of about 1% by weight of the acidic fluid. In an embodiment, the AGP comprises a biopolymer. "Biopolymer" as used herein refers to a polymer which can be found in a renewable natural resource such as a plant. In an embodiment, the biopolymer comprises a helical polysaccharide, for example diutan, scleroglucan, xanthan, or combinations thereof. In an embodiment, a biopolymer suitable for use in this disclosure has a molecular weight (MW) of from about 100,000 Daltons to about 10,000,000 Daltons, alternatively from about 300,000 Daltons to about 5,000,000 Daltons, alternatively from about 500,000 Daltons to about 1,500,000 Daltons. In an embodiment, a biopolymer suitable for use in this disclosure is in the solid form (e.g., as granules) and may have a mesh size of from about 80 to about 200, alternatively from about 10 to about 190, alternatively from about 50 to about 150.

In an embodiment, the AGP comprises a synthetic polymer. Examples of synthetic polymers suitable for use in this disclosure include without limitation copolymers of acrylamide and 2-acrylamido-2-methylpropane sulfonic acid (AMPS); copolymers of acrylamide and acrylic acid; copolymers of acrylamide and trimethylaminoethylmethacrylate chloride; copolymers of acrylamide and trimethylaminoethylmethacrylate sulfate; copolymers of acrylamide and trimethylaminoacrylate chloride; copolymers of acrylamide and trimethylaminoacrylate sulfate; copolymers of AMPS and dimethylaminoethyl methacrylate (DMAEMA); N-vinylpyrrolidone/AMPS copolymers; terpolymers of acrylamide, 2-acrylamido-2-methylpropane sulfonic acid and acrylic acid; terpolymers of acrylamide, acrylic acid and trimethylaminoethylamethacrylate chloride; terpolymers of acrylamide, acrylic acid and trimethylaminoethylmethacrylate sulfate; terpolymers of acrylamide, acrylic acid and trimethylaminoethylacrylate chloride; terpolymers of acrylamide, acrylic acid and trimethylaminoethylacrylate sulfate and combinations thereof. The molecular weight of the synthetic polymers can be greater than about 1 million Daltons, alternatively greater than about 3 million Daltons, alternatively greater than about 5 million Daltons. Non-limiting examples of synthetic AGPs suitable for use in this disclosure include SGA II gelling agent, SGA III gelling agent and SGA V gelling agent which are dispersions of crosslinkable polymers or SGA HT acid gelling system which is a high temperature gelling agent, all of which are commercially available from Halliburton Energy Services, Inc. as non-aqueous emulsions.

AGP polymers suitable for use in this disclosure may be anionic, cationic or neutral polymers. Such polymers may be used as solid additives, aqueous solutions or as oil emulsions. In an embodiment, the AGP polymer used is provided as an oil emulsion. In such embodiments, the amount of AGP polymer present in the oil emulsion may range from about 20% to about 60% by weight of the total emulsion.

In an embodiment, the AGP comprises a crosslinked polymer. In an embodiment, a fluid loss additive suitable for use in the present disclosure comprises an AGP and a crosslinking agent. For example, the AGP may comprise a random coil polymer (e.g., guar or cellulose) and a crosslinking agent such as a urea, aldehyde or phenol. It is contemplated that such mixtures which are capable of gelling acidic solutions of the type described herein may serve as fluid loss additives in CACs of the type described herein. In an embodiment, the AGP comprises a urea and a thickening or gelling agent. The gelling agent may comprise a galactomannan such as guar gum, gum karaya, gum tragacanth, gum ghatti, gum acacia, gum konjak, shariz, locus, psyllium, tamarind, gum tara, carrageenin, gum kauri, modified guars such as hydroxypropyl guar, hydroxyethyl guar, carboxymethyl hydroxyethyl guar, carboxymethyl hydroxypropyl guar and alkoxylated amines such as those represented by structure 1:

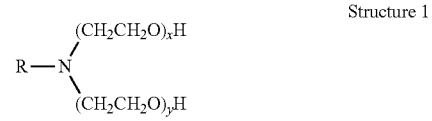

Structure 1 wherein R is selected from the saturated and unsaturated aliphatic groups having the range of from about 8 to 22 carbon atoms and mixtures thereof and the average sum of the value of x and y in the mixture is in the range of about 0 to about 10. Such mixtures are described in greater detail in U.S. Pat. No. 4,466,893 which is incorporated by reference herein in its entirety.

In an embodiment, the AGP is present in the wellbore servicing composition in an amount of from about 0.05 wt. % to about 3 wt. %, alternatively from about 0.1 wt. % to about 2 wt. %, alternatively from about 0.5 wt. % to about 1 wt. %, or alternatively from about 0.01 wt. % to about 0.3 wt. % based upon the weight of CAC in the wellbore servicing composition. Hereinafter the disclosure will refer to the use of an AGP as the fluid loss additive.

In some embodiments, the wellbore servicing composition further comprises a conventional set retarder. Conventional set retarders herein refer to materials which function to delay the onset of hydration of the cementitious materials and do not comprise an AGP of the type disclosed herein. Examples of conventional set retarders include without limitation organic acids, alkali metal salts of organic acid, carboxy hexoses, and the corresponding lactones, polyvalent metal salts (e.g., polyvalent metal halides), and the like. Examples of carboxy hexoses include gluconic acid, glucuronic acid, and combinations thereof. An example of a hexose lactone includes glucanolactone. Examples of organic acids and their salts that may function as a conventional set retarder include without limitation tartaric acid, citric acid, oxalic acid, gluconic acid, oleic acid, uric acid, ethylenediaminetetraacetic acid (EDTA), sodium citrate, or combinations thereof. The use of polyvalent metal halides as retarders is described in more detail for example in U.S. Patent Publication No. 2008/018264 which is incorporated by reference herein in its entirety.

In an embodiment, the wellbore servicing composition comprising a CAC and an AGP may also comprise a fluid loss control enhancer. The fluid loss control enhancer may function to improve the efficiency of fluid loss control by the AGP. Materials which may suitably function as fluid loss control enhancers include acidic materials which lower the pH of the slurry, materials which buffer the pH of the slurry at desired pH values, or alkali or alkaline earth metal salts. The fluid loss control enhancer may be further characterized as materials which do not adversely affect the functioning of other additives present in the CAC composition. For example, a fluid loss control enhancer suitable for use in this disclosure would not function as significant set retarders in a manner similar to the organic acid or metal halide retarders mentioned previously. Nonlimiting examples of fluid loss control enhancers suitable for use in this disclosure include glycolic acid, lactic acid, acetic acid, sodium chloride and calcium chloride, and the combinations thereof.

Materials suitable for use as fluid loss control enhancers in the present disclosure may be identified by measuring the effects of their presence on slurry properties using any suitable methodology. In high temperature applications, which require higher levels of an acidic retarder or a halide salt, for example an organic acid retarder such as citric acid or gluconic acid or a halide salt such as sodium chloride, the retarder itself may function as a fluid loss control enhancer. In situations which utilize metal halide type of retarders, an acidic fluid loss control enhancer that does not provide significant additional retardation may be included, and vice versa. Alternatively, any combination of a metal halide retarder, an organic acid retarder and an acidic or salt type of fluid loss control enhancer may be employed in combination with an AGP.

The wellbore servicing composition may include a sufficient amount of water to form a pumpable slurry. The water may be fresh water or salt water, e.g., an unsaturated aqueous salt solution or a saturated aqueous salt solution such as brine or seawater. The water may be present in the amount from about 20 wt. % to about 180 wt. %, alternatively from about 28 wt. % to about 60 wt. %, by weight of cement. The amount of water may depend on the desired density of the cement slurry and the desired slurry rheology and as such may be determined by one of ordinary skill in the art with the aid of this disclosure.

Additives may be included in the wellbore servicing composition for improving or changing the properties thereof. Examples of such additives include but are not limited to, defoamers, foaming surfactants, fluid loss agents, weighting materials, latex emulsions, dispersants, vitrified shale, or other fillers such as silica flour, sand and slag, formation conditioning agents, hollow glass, ceramic beads, or combinations thereof. Other mechanical property modifying additives, for example, elastomers, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art with the aid of this disclosure.

In an embodiment, a wellbore servicing composition comprises water, an AGP, and a CAC having greater than 60 wt. % of $Al_2O_3$ based upon the total weight of the CAC. In an embodiment, the wellbore servicing composition comprises a CAC in an amount of from about 20 wt. % to about 40 wt. % based on total weight of the composition; a flyash in an amount of from about 20 wt % to about 40 wt % based on total weight of the composition, an alkali salt of a polyphosphate in an amount from about 5 wt % to about 15 wt % based on total weight of the composition, an AGP in an amount of from about 0.2 wt. % to about 2 wt. % based on the weight of the CAC; and water in an amount of from about 25 wt % to about 60 wt % based on total weight of the composition. Here the total weight of the composition refers to the total weight of the solid and liquid components.

In an embodiment, the wellbore servicing composition excludes a Portland cement and/or a Sorel cement. In an embodiment, the wellbore servicing composition comprises equal to or less than about 10, 5, 4, 3, 2, 1, 0.1, 0.01 or 0.01 wt. % Portland cement and/or Sorel cement based on the total weight of the composition.

In an embodiment, the wellbore servicing composition comprises a CAC and an AGP each of the type described previously herein and is hereinafter designated COMP. It is contemplated that the COMP may be prepared as a cement slurry which can be placed into a subterranean formation and set into a hard mass. In an embodiment, a methodology for the preparation of cementitious slurry of the type described herein (i.e., a COMP) comprises contacting the components of the COMP in any order compatible with the needs of the process. For example, the COMP may be prepared by dry mixing the AGP, when in solid state, and other solid materials to be included in the composition to form a dry mixture which may then be contacted with the liquid components of the COMP. In the alternative, the AGP, when in solid or emulsion state, or in aqueous solution, may be added to the liquid components of the COMP prior to, concurrently with, or subsequent to the other components of the COMP. The components of the COMP may be contacted using any mixing device compatible with the composition, for example a batch mixer, or a recirculating cement mixer (RCM) having continuous feed lines for high volume cement production.

The COMP may be characterized by the ability to provide fluid loss control in high temperature wellbores. In an embodiment, the COMP may display a fluid loss of from about 10 cc/30 min to about 600 cc/30 minutes, alternatively from about 10 cc/30 min to about 500 cc/30 min, alternatively from about 30 cc/30 minutes to about 300 cc/30 min, or alternatively from about 50 cc/30 min to about 150 cc/30 min, wherein the fluid loss measurements were performed and calculated according to specifications recommended in ANSI/API Recommended Practice 10B-2 (Formerly 10-B), First Edition, July 2005. Furthermore, the COMP may be applied in a wide temperature range, for example, from about 50° F. to about 500° F., alternatively from about 120° F. to about 500° F., alternatively from about 150° F. to about 300° F., alternatively from about 180° F. to about 250° F.

The COMPs disclosed herein can be used for any purpose. In an embodiment, the COMPs are used as wellbore servicing compositions to service a wellbore that penetrates a subterranean formation. It is to be understood that "subterranean formation" encompasses both areas below exposed earth and areas below earth covered by water such as ocean or fresh water. Servicing a wellbore includes, without limitation, positioning the COMP in the wellbore to isolate the subterranean formation from a portion of the wellbore, wherein the subterranean formation may or may not contain acidic gases; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; and to seal an annulus between the wellbore and an expandable pipe or pipe string. For instance, the COMP may set in a loss-circulation zone and thereby restore circulation. The set composition plugs the zone and inhibits loss of subsequently pumped drilling fluid, which allows for further drilling. Methods for introducing compositions into a wellbore to seal subterranean zones are described for example in U.S. Pat. Nos. 5,913,364; 6,167,967; and 6,258,757, each of which is incorporated by reference herein in its entirety.

In an embodiment, the COMPs may be employed in well completion operations such as primary and secondary cementing operations. Said compositions may be placed into an annulus of the wellbore and allowed to set such that it isolates the subterranean formation from a different portion of the wellbore. The COMPs thus form a barrier that prevents fluids in that subterranean formation from migrating into other subterranean formations. Within the annulus, the fluid also serves to support a conduit, e.g., casing, in the wellbore.

In an embodiment, the wellbore in which the COMPs are positioned belongs to a multilateral wellbore configuration. It is to be understood that a multilateral wellbore configuration refers to a single well with one or more wellbore branches radiating from the main borehole. In secondary cementing, often referred to as squeeze cementing, the COMP may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a wellbore servicing composition in a wellbore are described for example in U.S. Pat. Nos. 5,346,012 and 5,588,488, which are incorporated by reference herein in their entirety.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

The effects of various polymers on the viscosity of acidic solutions were investigated. Acid gelling polymer solutions at a 1% polymer concentration were prepared in either water, 5% hydrochloric acid or 5% acetic acid by stirring for 24 hrs. The viscosities of the resulting solutions were measured at the temperature indicated in Table 1 on a Brookfield LVT viscometer using a #2 spindle. Sample 1 contained FDP 662 which is a cationic starch commercially available from Halliburton Energy Services, Inc. and is known to be an effective fluid control agent for CAC cement slurry compositions comprising a calcium aluminate cement having an alumina content of about 60%. Sample 2 contained the nonionic, random coil biopolymer scleroglucan, while Sample 3 contained diutan which is a slightly anionic biopolymer. Sample 4 contained GENU USP 100 which is a pectinate. Samples 5-7 contained the indicated SGA polymer while Sample 8 contained UCARFLOC 302 flocculating agent for mining applications which is a polyethylene oxide commercially available from Dow Chemical Company and functions as a water viscosifying synthetic polymer. The results are shown in Table 1.

TABLE 1

| Sample No. | Polymer | Charge | Temp, °F. | Viscosity in water cP | Viscosity in 5% HCl cP | Viscosity in 5% acetic acid, cP |
|---|---|---|---|---|---|---|
| 1 | FDP 662 | Cationic starch biopolymer | 78 | 3.75 | 2.5 | 6.25 |
| 2 | Scleroglucan | Non-ionic biopolymer | 78 | 9100 | 8550 | 7550 |
| 3 | Diutan (Clarified) | Slightly anionic biopolymer | 78 | 171,000 | 139,000 | 177,000 |
|   |   |   | 180 | 38000 | 200 | 49000 |
| 4 | Pectin (Genu USP 100) | Anionic biopolymer | 78 | 50 | 30 | 30 |
| 5 | SGA V | Anionic | 78 | 6450 | 3750 | 5150 |
|   |   |   | 180 | 4000 | 1500 | 4250 |
| 6 | SGA II | Anionic | 78 | 17700 | 2500 | 8300 |
|   |   |   | 180 | 9450 | 1000 | 6600 |
| 7 | SGA III (Note) | Cationic | 78 | 2800 | 313 | 8700 |
|   |   |   | 180 |   | 350 | 200 | 7500 |
| 8 | UCARFLOC 302 | nonionic | 78 | 495 | 280 | 220 |

Note:
650 cP after 1 hr heating at 180° F., decreased to 350 cP after 2 hrs at 180° F. Viscosity was 600 cP after cooling to room temperature. No viscosity increase was noted after acidifying the cooled solution with acetic acid for a final concentration of 5%.

The results show that samples having helical biopolymers, scleroglucan or diutan (Samples 2, 3) markedly increased the viscosity of acidic solutions to which they were added, whereas samples comprising random coil biopolymers, such as waxy maize starch (FDP 662) or pectinate (GENU USP 100) polymers (Samples 1 and 4) when added to acidic fluids did not result in a marked viscosity increase. The synthetic AGPs investigated (Samples 5-7) irrespective of their charge also increased the viscosity of the acid solutions. A conventional synthetic aqueous solution viscosifier, UCARFLOC 302, did not increase the viscosity of acid solutions to the same extent as the other AGPs.

Example 2

The effect of the addition of an AGP on the fluid loss of various cement compositions was investigated. Calcium aluminate cement slurries were prepared that contained a fluid loss additive and a retarder in the amounts indicated in Table 2. The slurries were prepared to a density of 15 ppg by the addition of SGA oil emulsions to the mix water along with other liquid additives, followed by the addition of a dry blend of calcium aluminate cement. Specifically, each sample contained 450 grams of a calcium aluminate cement having an alumina content of about 70%, 160 grams of water and 24.5 grams of CFR-3 cement friction reducer. To this mixture was added 1 gram of D-Air 3000L defoamer and the slurry mixed as per API schedule. Additional components such as $CaCl_2$, NaCl, or Fe-2 are present as indicated in Table 2. CFR-3 cement friction reducer is a dispersant; Fe-2 iron sequestering agent is an additive and D-AIR 3000L defoamer is a cementing defoamer, all of which are commercially available from Halliburton Energy Services, Inc. Fluid loss was measured in accordance with ANSI/API Recommended Practice 10B-2 (Recommended Practices for Testing Well Cements), First Edition, July 2005, the relevant portions of which are incorporated herein by reference. The result of the inclusion of a various non-acid gelling polymers on the fluid loss for the cement compositions is presented in Table 3.

FR 56 is an oil emulsion of high molecular weight polyacrylamide with about 30% hydrolysis commercially available from Halliburton Energy Services, Inc.; FR 48W is a cationic polyacrylamide commercially available from Halliburton Energy Services, Inc.; SUPERFLOC HX 800 processing polymer is a hydroxaminated polymer commercially available from Cytec; PYRATEX 241 is a cationic latex commercially available from Latex Co.; JAGUAR C-17 guar gum is a guar gel containing hydroxypropyltrimethylammonium chloride commercially available from Rhodia; FDP 862 is a anionic/cationic fluid loss additive commercially available from Nalco; UCARFLOC flocculating agent for mining applications is a polyethylene oxide commercially available from Dow Chemical Company; CELVOL polyvinyl alcohol is a polyvinyl alcohol commercially available from Sekisui Specialty Chemicals; Pectin is a pectinate composition commercially available from CP Kelco; ALCOGUM L 520 rheology modifier is a hydrophobically modified acid swellable polymer commercially available from Alco Chemicals; VERSA TL 502 performance polymer is a sulfonated polymer commercially available from Akzo Nobel; WG 33 gelling agent is a hydroxyethylcellulose commercially available from Halliburton Energy Services, Inc.; HPT-1 is a zwitterionic hydrophobic polymer commercially available from Halliburton Energy Services, Inc.; and N V is HB Cellulosic Biopolymer is a microfibrous cellulosic material commer-

TABLE 2

| Expt. No. | Fluid Loss Additive | Fluid Loss Polymer amount (% bwoca*) | Retarder | Retarder Amount (% bwoc**) | Temp. (° F.) | Fluid Loss (cc/30 min) |
|---|---|---|---|---|---|---|
| 1 | SGA III | 2.3 | $CaCl_2$ (aqueous) | 3.0 | 180 | 108 |
| 2 | SGA III | 2.3 | Fe-2 | 0.8 | 180 | 134 |
| 3 | SGA III | 2.6 | NaCl (dry) | 4.0 | 180 | 167 |
| 4 | SGA II | 1.4 | Fe-2 | 0.5 | 180 | 310 |
| 5 | SGA V | 1.5 | NaCl (dry) | 4.0 | 180 | 253 |
| 6 | SGA V | 1.8 | Fe-2 | 0.5 | 180 | 99 |
| 7 | SGA V | 2.1 | Fe-2 | 2 | 135 | 64 |
| 8 | SGA HT | 3.3 | Fe-2 | 0.5 | 135 | 410 |

*% bwoca = % by weight of calcium aluminate
**% bwoc- = % by weight of total cementitious material

TABLE 3

| Expt. No. | Polymer | Polymer Amount (% bwoc) | Retarder | Retarder Amount (% bwoc) | Temp. (° F.) | Fluid Loss (cc/30 min) |
|---|---|---|---|---|---|---|
| 1 | FR-56 | 2.22 | Fe-2 | 0.5 | 180 | 310 |
| 2 | FR 48W | 2.14 | NaCl | 4 | 180 | 620 |
| 3 | SUPERFLOC HX 800 | 2.54 | $CaCl_2$ (aqueous) | 6.1 | 180 | 1073 |
| 4 | CATIONIC LATEX | 6.7 | $CaCl_2$ (aqueous) | 3.0 | 180 | 1030 |
| 5 | JAGUAR C-17 | 0.3 | NaCl (dry) | 4 | 180 | 990 |
| 6 | FDP 862 | 0.75 | $CaCl_2$ (aqueous) | 3 | 180 | 1210 |
| 7 | UCARFLOC 302 | 0.3 | — | — | 180 | 1400 |
| 8 | CELVOL 350 | 1.0 | NaCl (dry) | 4 | 180 | 1800 |
| 9 | Pectin (Genu USP 100) | 0.5 | NaCl (dry) | 4 | 180 | 1800 |
| 10 | ALCOGUM L520 | 2.59 | NaCl (dry) | 4 | 180 | 1800 |
| 11 | VERSA TL 502 | 0.5 | NaCl (dry) | 4 | 180 | >1800 |
| 12 | WG 33 | 1 | $CaCl_2$ (aqueous) | 3.75 | 180 | >1800 |
| 13 | HPT-1 | 3.51 | NaCl (dry) | 4 | 180 | >1800 |
| 14 | N Vis HB | 2 | NaCl | 4 | 180 | 1800 | cially available from Baroid. Effective fluid loss control agents are characterized by the observation that they increase the viscosity of acid solutions, particularly those containing organic acids. Comparison of the results in Table 1 and Table 2 show that acid viscosifying polymers which are effective fluid loss control additives, when present in about 1% concentration, increase the viscosity of a 5% acetic acid greater than 220 psi. The results in Table 2 also indicate that for some AGP polymers, for example SGA III, fluid loss is control is enhanced when calcium chloride was used as the retarder compared to an organic acid (Fe-2) retarder, whereas for other AGPs, for example SGA V, fluid loss control is enhanced by an organic acid retarder in comparison to a metal halide retarder. The results indicate organic acids and polyvalent metal halides, irrespective of their ability to retard the cement composition, can be used as fluid loss control enhancers in combination with AGP polymers. The results also indicate that the fluid loss control by polymers is independent of the polymer charge.

Example 3

The fluid loss and rheological properties of a composition comprising an AGP were investigated. A 15 ppg CAC composition was prepared using 100% bwoc of a calcium aluminate cement having an alumina content of about 70%, 0.20 gps SGA-V, 0.50% bwoc citric acid and 2.0% bwoc CFR-3 cement friction reducer. The rheology of the compositions was investigated by measuring the viscosity using a F1 spring while the fluid loss was measured using a FANN Model 35 viscometer at temperatures ranging from ambient to 180° F. Table 4 presents the results of varying the temperature on the rheology and fluid loss properties of the composition while Table 5 presents the results of varying the concentration of the fluid loss additive on the fluid loss and rheological properties. These results can be compared to compositions employing non acid-gelling polymers, e.g., FDP 662 or LATEX 2000, as fluid loss additives, Table 6. A reduction in the density of the cement to 13 ppg results in improved fluid loss control and this data is presented in Table 7.

TABLE 4

| Temperature (° F.) | Fluid loss (ml) | Rheology at 80° F. | | | | | | |
|---|---|---|---|---|---|---|---|---|
| | | 3 rpm | 6 rpm | 30 rpm | 60 rpm | 100 rpm | 200 rpm | 300 rpm |
| 80° F. | 88 | 21 | 30 | 67 | 103 | 141 | 255 | 300+ |
| 135° F. | 149 | 10 | 15 | 49 | 84 | 128 | 245 | 300+ |

TABLE 5

| Temperature (° F.) | SGA concentration gps | Fluid loss (ml) | Rheology at 80° F. | | | | | | |
|---|---|---|---|---|---|---|---|---|---|
| | | | 3 rpm | 6 rpm | 30 rpm | 60 rpm | 100 rpm | 200 rpm | 300 rpm |
| 80° F. | 0.2 | 88 | 21 | 30 | 67 | 103 | 141 | 255 | 300+ |
| | 0.25 | 87 | 13 | 22 | 70 | 118 | 175 | 300+ | 300+ |
| | 0.3 | 62 | 21 | 32 | 90 | 150 | 225 | 300+ | 300+ |
| 135° F. | 0.2 | 149 | 10 | 15 | 49 | 84 | 128 | 245 | 300+ |
| | 0.25 | 130 | 11 | 20 | 75 | 121 | 185 | 300+ | 300+ |
| | 0.3 | 64 | 18 | 33 | 101 | 175 | 300+ | 300+ | 300+ |

TABLE 6

| Fluid Loss Additive | Concentration | API Fluid Loss at 80° F. | Rheology at 80° F. | | | | | |
|---|---|---|---|---|---|---|---|---|
| | | | 3 rpm | 6 rpm | 100 rpm | 200 rpm | 300 rpm | 600 rpm |
| FDP 662 | 0.50 gps | Blow off in few seconds | 4 | 6 | 72 | 130 | 184 | 300+ |
| LATEX-2000* | 1.00 gps | Blow off in a few seconds | 11 | 16 | 125 | 185 | 258 | 300+ |
| Anionic polysaccharide | 0.5% bwoc | Blow out in a few seconds | ND | ND | ND | ND | ND | ND |
| Na-CMC | 0.5% bwoc | 274 ml | ND | ND | ND | ND | ND | ND |

*0.010 gps of STABILIZER 434B and 0.10% CFR-3 was added to LATEX 2000 additive. STABILIZER 434B latex stabilizer is a liquid material commercially available from Halliburton Energy Services, Inc.

FDP 662 is a cationic starch which is commercially available from Halliburton Energy Services, Inc.; LATEX 2000 emulsion is a styrene/butadiene copolymer latex commercially available from Halliburton Energy Services, Inc.; the anionic polysaccharide is anionic cellulose; and Na-CMC is sodium carboxymethylcellulose.

TABLE 7

| Temperature (° F.) | Fluid loss (ml) | Rheology at 80° F. | | | | | | | |
|---|---|---|---|---|---|---|---|---|---|
| | | 3 rpm | 6 rpm | 30 rpm | 60 rpm | 100 rpm | 200 rpm | 300 rpm | 600 rpm |
| 80° F. | NA | 2 | 3 | 9 | 15 | 22 | 24 | 56 | 115 |
| 135° F. | 58 | 2 | 4 | 10 | 16 | 24 | 43 | 72 | 198 |

Example 4

The effect of a polysaccharide biopolymer based gelling additive on a calcium aluminate cement slurry was investigated. Particularly, a calcium aluminate cement slurry comprising water and cement was prepared as in Example 2. A polysaccharide biopolymer and a retarder both of the amount and type indicated in Table 8 were added to the slurry. The fluid loss was measured at 180° F. as described previously herein.

TABLE 8

| Expt. No. | Polysaccharide | Polysaccharide amount (% bwoc) | Retarder | Retarder Amount (% bwoc) | Fluid Loss (cc/30 min) |
|---|---|---|---|---|---|
| 1 | Diutan (Clarified Grade) | 0.4 | NaCl (dry) | 4 | 187 |
| 2 | Diutan (clarified) | 0.4 | Fe-2 | 1 | 790 |
| 3 | Scleroglucan | 0.5 | NaCl (dry) | 4.0 | 264 |
| 4 | Scleroglucan | 0.5 | NaCl | 4.0 | 408* |
| 5 | BIOZAN** | 0.38 | Fe-2 | 0 | 500 |
| 6 | Xanthan | 0.5 | NaCl | 4 | 420 |
| 7 | Xanthan | 0.5 | Fe-2 | 1 | 355 |

*The pH of the slurry was reduced from 6.6 to 5.3 by the addition of phosphoric acid
**BOZAN is a high molecular weight biopolymer commercially available from Kelco Oil Filed Group.

The results demonstrate that acid gelling polymers provide effective fluid loss control of high alumina cements. The results in Table 8 show that biopolymers and comparison of the results with those for modified biopolymers listed Table 3 (Samples 5, 9, 12 and 14) demonstrate that helical biopolymers are more effective in providing fluid loss control of CAC slurries. Additionally these helical biopolymers are also effective in increasing the viscosity of acid solutions in comparison to random coil type of biopolymers, for example FDP 662, as shown in Table 1. The results also demonstrate that for some AGP polymers, for example diutan, fluid loss control is enhanced in the presence of a halide salt in comparison to an organic acid, whereas for other biopolymers, for example xanthan, the opposite effect is observed. By the benefit of this knowledge, suitable combinations of AGP biopolymers, retarders, and fluid loss control enhancers can be made for enhance the fluid loss control function.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising:
   preparing a composition comprising a calcium aluminate cement, water, and a fluid loss additive, wherein the calcium aluminate cement comprises aluminum oxide in an amount of greater than about 60 wt. % based on a total weight of the calcium aluminate cement and wherein the fluid loss additive comprises an acid gelling polymer;
   placing the composition in the wellbore; and
   allowing the composition to set, wherein the composition has a fluid loss of from about 10 cc/10 min. to about 600 cc/30 min. at a temperature of from about 50° F. to about 500° F.

2. The method of claim 1 wherein the calcium aluminate cement has an aluminum oxide:calcium oxide ratio of from about 1:1 to about 4:1.

3. The method of claim 1 wherein the composition has a pH in a range of from about 3 to about 9.

4. The method of claim 1 wherein the calcium aluminate cement is present in the composition in an amount of from about 20 wt. % to about 99 wt. % based on a total weight of the composition.

5. The method of claim 1 wherein the acid gelling polymer increases a viscosity of an acidic fluid by equal to or greater than about 100 cP when the acid gelling polymer is present in an amount of about 1 wt. % of the acidic fluid and the acid in the acidic fluid is at a concentration of about 5 wt. %.

6. The method of claim 5 wherein the acidic fluid comprises hydrochloric acid, hydrofluoric acid, acetic acid, formic acid, citric acid, ethylenediaminetetraacetic acid (EDTA), glycolic acid, sulfamic acid, or combinations thereof.

7. The method of claim 1 wherein the acid-gelling polymer comprises a biopolymer.

8. The method of claim 7 wherein the biopolymer comprises a helical polysaccharide, diutan, scleroglucan, xanthan or combinations thereof.

9. The method of claim 1 wherein the acid gelling polymer comprises a mixture of guar or cellulose, and crosslinking agent.

10. The method of claim 7 wherein the biopolymer has a molecular weight of from about 100,000 Daltons to about 10,000,000 Daltons.

11. The method of claim 1 wherein the acid-gelling polymer comprises a synthetic polymer.

12. The method of claim 11 wherein the synthetic polymer comprises copolymers of acrylamide and 2-acrylamido-2-methylpropane sulfonic acid (AMPS); copolymers of acrylamide and acrylic acid; copolymers of acrylamide and trimethylaminoethylmethacrylate chloride; copolymers of acrylamide and trimethylaminoethylmethacrylate sulfate; copolymers of acrylamide and trimethyaminoacrylate chloride; copolymers of acrylamide and trimethylaminoacrylate sulfate; copolymers of AMPS and dimethylaminoethyl methacrylate (DMAEMA); N-vinylpyrrolidone/AMPS copolymers; terpolymers of acrylamide, 2-acrylamido-2-methylpropane sulfonic acid and acrylic acid; terpolymers of acrylamide, acrylic acid and trimethylaminoethylamethacrylate chloride; terpolymers of acrylamide, acrylic acid and trimethylaminoethylmethacrylate sulfate; terpolymers of acrylamide, acrylic acid and trimethylaminoethylacrylate chloride; terpolymers of acrylamide, acrylic acid and trimethylaminoethylacrylate sulfate; or combinations thereof.

13. The method of claim 12 wherein the synthetic polymer has a molecular weight of greater than about $1 \times 10^6$ Daltons.

14. The method of claim 1 wherein the fluid loss additive is present in the composition in an amount of from about 0.05 wt. % to about 3 wt. % based upon weight of the calcium aluminate cement.

15. The method of claim 1 wherein the composition further comprises a set retarder.

16. The method of claim 15 wherein the set retarder comprises organic acids, alkali metal salts of organic acid, tartaric acid, citric acid, oxalic acid, gluconic acid, oleic acid, uric acid, ethylenediaminetetraacetic acid (EDTA), sodium citrate, or combinations thereof.

17. The method of claim 1 wherein the composition further comprises a fluid loss control enhancer.

18. The method of claim 17 wherein the fluid loss control enhancer comprises acidic materials which lower a pH of a slurry, materials which buffer the pH of the slurry at desired pH values, alkali or alkaline earth metal salts, or combinations thereof.

19. The method of claim 1 wherein the composition excludes a Portland cement, a Sorel cement, or both.

20. A method of servicing a wellbore comprising;
placing into a wellbore having a bottom hole static temperature of greater than about 50° F., a pH of from about 3 to about 9, or both; a cement slurry comprising a calcium aluminate cement having an aluminum oxide content of greater than about 60 wt. % based on a total weight of the calcium aluminate cement; and a fluid loss additive consisting essentially of an acid-gelling polymer wherein the cement slurry has a fluid loss ranging from about 10 cc/10 min. to about 600 cc/30 min.

21. The method of claim 20 wherein the acid gelling polymer increases a viscosity of an acidic fluid by equal to or greater than about 100 cP when the acid gelling polymer is present in an amount of about 1 wt. % of the acidic fluid and the acid in the acidic fluid is at a concentration of about 5 wt. %.

22. The method of claim 20 wherein the cement slurry further comprises a fluid loss control enhancer.

23. The method of claim 22 wherein the fluid loss control enhancer is selected from the group consisting of a metal halide retarder, an organic acid retarder, and combinations thereof.

* * * * *

UNITED STATES PATENT AND TRADEMARK OFFICE
CERTIFICATE OF CORRECTION

PATENT NO. : 8,668,010 B2
APPLICATION NO. : 12/961234
DATED : March 11, 2014
INVENTOR(S) : Trissa Joseph et al.

Page 1 of 1

It is certified that error appears in the above-identified patent and that said Letters Patent is hereby corrected as shown below:

In the Specification

In Column 10, line 25, replace "N V is HB" with --N Vis HB--.

Signed and Sealed this
Twenty-seventh Day of May, 2014

Michelle K. Lee
*Deputy Director of the United States Patent and Trademark Office*